(12) United States Patent
Louie

(10) Patent No.: US 12,403,665 B2
(45) Date of Patent: Sep. 2, 2025

(54) REUSABLE COMPOSITE CURING SYSTEM

(71) Applicant: The Boeing Company, Arlington, VA (US)

(72) Inventor: Michael Kenneth-Que Louie, Renton, WA (US)

(73) Assignee: The Boeing Company, Arlington, VA (US)

( * ) Notice: Subject to any disclaimer, the term of this patent is extended or adjusted under 35 U.S.C. 154(b) by 204 days.

(21) Appl. No.: 18/336,779

(22) Filed: Jun. 16, 2023

(65) Prior Publication Data

US 2024/0416599 A1 Dec. 19, 2024

(51) Int. Cl.
*B29C 70/44* (2006.01)
*B29C 70/54* (2006.01)

(52) U.S. Cl.
CPC .......... *B29C 70/443* (2013.01); *B29C 70/544* (2021.05)

(58) Field of Classification Search
CPC ..... B29C 33/505; B29C 70/44; B29C 70/443; B29C 70/446; B29C 70/54; B29C 70/544; B29C 2043/3649
See application file for complete search history.

(56) References Cited

U.S. PATENT DOCUMENTS 9,914,244 B2 3/2018 Dull et al.

FOREIGN PATENT DOCUMENTS

CN 110524908 A 12/2019

OTHER PUBLICATIONS

Air Compressor Self Lock Push Pull Fit Hose Manual Quick Disconnect Connector Coupler Air couplings (Year: 2025).*
Extended European Search Report, dated Nov. 27, 2024, regarding EP Application No. 24182360.8, 6 pages.
Musch G et al: "Tooling with reinforced elastomeric materials", Composites Manufacturing, Butterworth Scientific, Guildford, Surrey, GB, vol. 3, No. 2, Jan. 1, 1992 (Jan. 1, 1992), pp. 101-111, XP023627137, ISSN: 0956-7143, DOI: 10.1016/0956-7143(92)90122-B [retrieved on Jan. 1, 1992].

* cited by examiner

*Primary Examiner* — Yunju Kim
(74) *Attorney, Agent, or Firm* — Yee & Associates, P.C.

(57) ABSTRACT

A reusable composite curing system comprising a reusable bladder; an end fitting sealed to the reusable bladder, the end fitting containing a passage in communication with an interior of the reusable bladder and a first half of the pneumatic connector secured within the end fitting and in communication with the passage; and a cure tool having a venting channel extending from a supporting surface of the cure tool and exiting through one of an underside or a side of the cure tool, and a second half of a pneumatic connector secured within the venting channel; the first half of the pneumatic connector releasable from the second half of the pneumatic connector while maintaining the second half of the pneumatic connector in the cure tool and while maintaining the first half of the pneumatic connector in the end fitting.

18 Claims, 8 Drawing Sheets

REUSABLE COMPOSITE CURING SYSTEM

BACKGROUND INFORMATION

1. Field

The present disclosure generally relates to methods and equipment for fabricating composite resin parts, and deals more particularly with a reusable composite curing system used in curing composite parts.

2. Background

Composite resin parts may be cured within an autoclave that applies heat and pressure to the part during a cure cycle. Some part geometries include internal cavities that may cause the part to collapse under autoclave pressure unless a tool such as an inflatable bladder is placed in the cavity. Such an inflatable bladder may be inflated during a cure process so as to react the autoclave pressure force applied to the part. Typically, these inflatable bladders are pressurized by venting them to the autoclave pressure through a vacuum bag.

Venting through the vacuum bag requires additional sealing which can take an undesirable amount of time and generate waste from seals and disposable vacuum bags. Additionally, failure to properly vent through the vacuum bag can result in the reusable bladder failing to pressurize and undesirably affecting the resulting composite part quality.

Therefore, it would be desirable to have a method and apparatus that takes into account at least some of the issues discussed above, as well as other possible issues.

SUMMARY

An embodiment of the present disclosure provides a reusable composite curing system. The reusable composite curing system comprises a reusable bladder; an end fitting sealed to the reusable bladder; and a cure tool having a venting channel extending from a supporting surface of the cure tool and exiting through one of an underside or a side of the cure tool. The end fitting contains a passage in communication with an interior of the reusable bladder and a first half of the pneumatic connector secured within the end fitting and in communication with the passage. The cure tool has a second half of a pneumatic connector secured within the venting channel. The first half of the pneumatic connector is releasable from the second half of the pneumatic connector while maintaining the second half of the pneumatic connector in the cure tool and while maintaining the first half of the pneumatic connector in the end fitting.

Another embodiment of the present disclosure provides a reusable composite curing system. The reusable composite curing system comprises a reusable bladder configured to apply pressure to an internal cavity of a composite part during autoclave curing, an end fitting sealed to the reusable bladder, the end fitting containing a passage in communication with an interior of the reusable bladder and a first half of a pneumatic connector in communication with the passage and secured within the end fitting, and a reusable vacuum bag sealed over the reusable bladder and the end fitting. The first half of the pneumatic connector is releasable from a second half of the pneumatic connector while maintaining the half of the pneumatic connector in the end fitting.

Another embodiment of the present disclosure provides a method of curing a composite material. A reusable bladder is lowered towards a cure tool such that a first half of a pneumatic connector secured in an end fitting sealed to the reusable bladder connects to a second half of a pneumatic connector secured in the cure tool, the pneumatic connector forming a pressure passageway to provide an external pressure to an interior of the reusable bladder. Heat and pressure are applied to the composite material supported on the cure tool and the reusable bladder to cure the composite material to form a composite part having an internal cavity.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
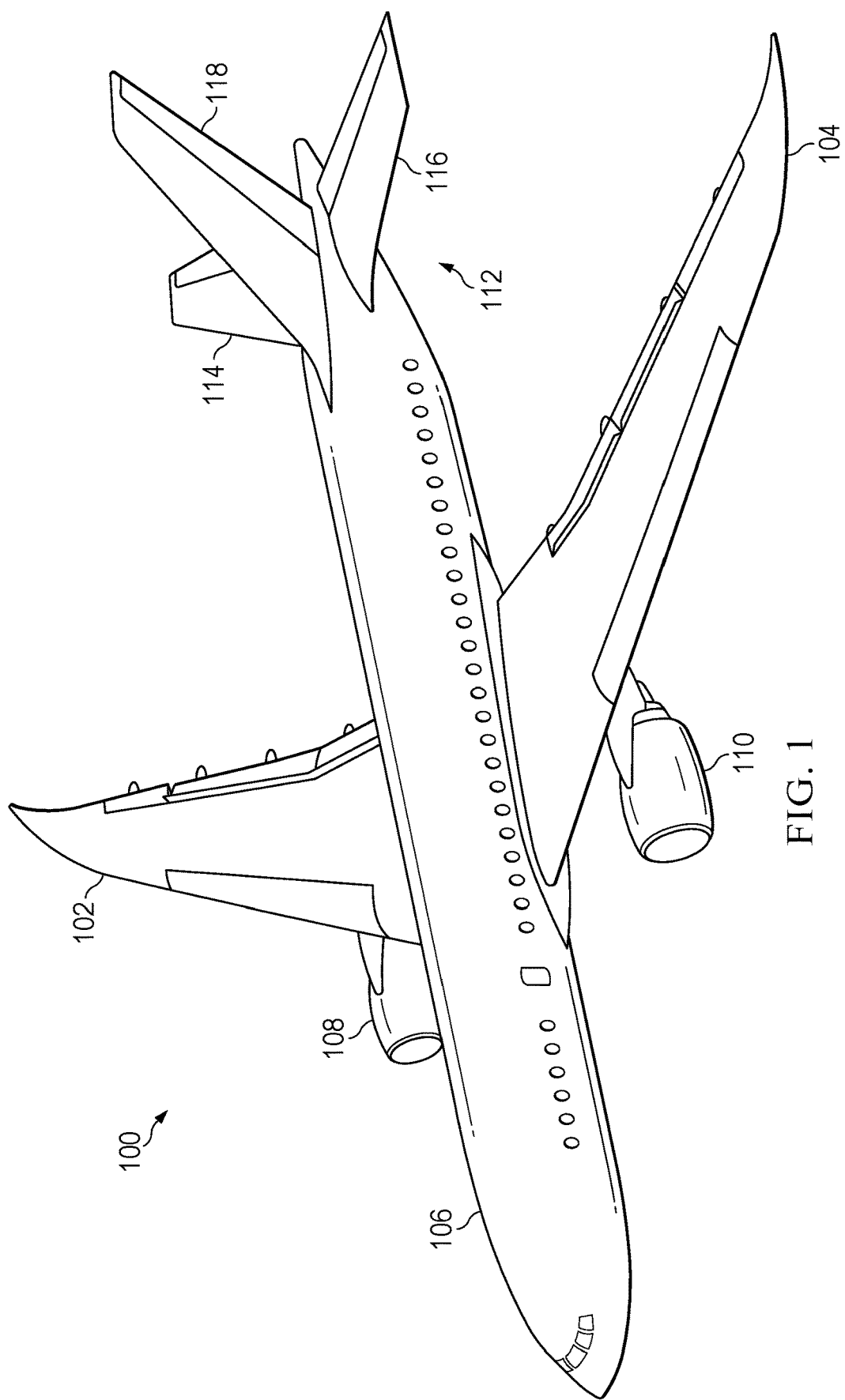
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite parts formed using the reusable composite curing system of the illustrative examples. For example, at least one of wing 102, wing 104, or body 106 can have a skin and stiffeners cured using the reusable composite curing system of the illustrative examples.

Figure 2:
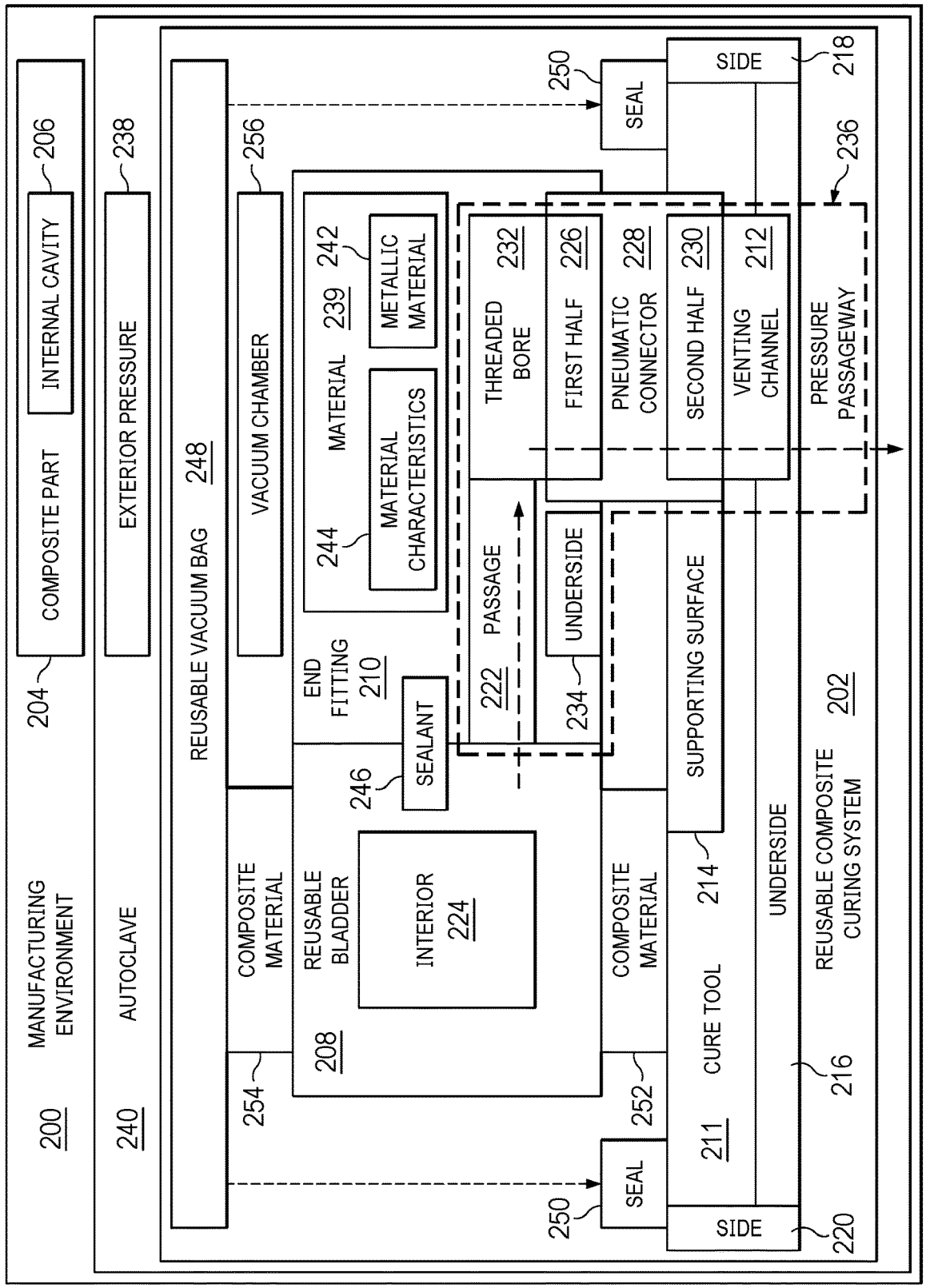
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Reusable composite curing system 202 can be used to cure components of aircraft 100 of FIG. 1. Reusable composite curing system 202 is used within manufacturing environment 200 to form composite part 204 having internal cavity 206.

Reusable composite curing system 202 comprises reusable bladder 208, end fitting 210 sealed to reusable bladder 208, and cure tool 211 having venting channel 212 extending from supporting surface 214 of cure tool 211 and exiting through one of underside 216 or a side of cure tool 211, such as side 218 or side 220. End fitting 210 contains passage 222 in communication with interior 224 of reusable bladder 208 and first half 226 of pneumatic connector 228 secured within end fitting 210 and in communication with passage 222. Second half 230 of pneumatic connector 228 is secured within venting channel 212. First half 226 of pneumatic connector 228 is releasable from second half 230 of pneumatic connector 228 while maintaining second half 230 of pneumatic connector 228 in cure tool 211 and while maintaining first half 226 of pneumatic connector 228 in end fitting 210.

First half 226 takes the form of any desirable type of pneumatic connector half. In some illustrative examples, pneumatic connector 228 is a quick connector. In these illustrative examples, first half 226 can be one of a male quick connector or a female quick connector.

Second half 230 takes the form of any desirable type of pneumatic connector half. In some illustrative examples, pneumatic connector 228 is a quick connector. In these illustrative examples, second half 230 can be one of a male quick connector or a female quick connector. In some illustrative examples, one of first half 226 and second half 230 of pneumatic connector 228 is a female quick connector, and the other of first half 226 and second half 230 is a male quick connector.

As depicted, wherein end fitting 210 comprises threaded bore 232 extending through underside 234 of end fitting 210. Threaded bore 232 does not extend through the thickness of end fitting 210. Threaded bore 232 terminates into passage 222. First half 226 of pneumatic connector 228 is secured within threaded bore 232. In some illustrative examples, first half 226 remains secured within end fitting 210 during and between curing operations.

Passage 222 extends into end fitting 210 in a manner to pneumatically connect to first half 226 of pneumatic connector 228. In some illustrative examples, passage 222 runs perpendicular to first half 226 of pneumatic connector 228. In some illustrative examples, passage 222 runs parallel to a longitudinal axis of end fitting 210. In some illustrative examples, passage 222 runs perpendicular to threaded bore 232.

Pressure passageway 236 provides access to interior 224 of reusable bladder 208 for pressurization. In some illustrative examples, passage 222, pneumatic connector 228, and venting channel 212 define pressure passageway 236 that allows an interior of the reusable bladder to be subjected to external pressure 238. End fitting 210 is formed of material 239.

Material 239 can be any desirable material configured to withstand the heat and pressure of autoclave 240. End fitting 210 is formed of any desirable material configured to maintain its shape when subjected to increased temperature and increased pressure during composite curing. In some illustrative examples, end fitting 210 is formed of metallic material 242.

Material 239 is selected that has material characteristics 244 to withstand curing within autoclave 240. Material 239 is selected that has material characteristics 244 to remain pneumatically sealed to reduce or prevent leaks between end fitting 210 and pneumatic connector 228. Material 239 is selected that has material characteristics 244 that can be sealed to reusable bladder 208.

To secure end fitting 210 to reusable bladder 208, sealant 246 is applied between reusable bladder 208 and end fitting 210. Material 239 can be selected to seal to reusable bladder 208 using sealant 246.

In some illustrative examples, material 239 is machined to form end fitting 210. For example, metallic materials can be machined to a desirable shape for end fitting 210. In some illustrative examples, material 239 for end fitting 210 can be printed or molded.

Reusable composite curing system 202 comprises reusable vacuum bag 248 sealed to cure tool 211 and completely covering reusable bladder 208 and end fitting 210. Reusable vacuum bag 248 is sealed to cure tool 211 using seal 250. Seal 250 surrounds a perimeter of reusable vacuum bag 248. Seal 250 forms a sealed volume between reusable vacuum bag 248 and cure tool 211. The sealed volume between reusable vacuum bag 248 and cure tool 211 can be referred to as vacuum chamber 256. Seal 250 can take any desirable disposable or reusable form.

After sealing reusable vacuum bag 248 to cure tool 211, composite material 252 and composite material 254 can be cured to form composite part 204 having internal cavity 206. Composite material 252 is applied to cure tool 211 prior to connecting end fitting 210 to cure tool 211 using pneumatic connector 228. Although supporting surface 214 appears planar, supporting surface 214 can have any desirable geometry. In some illustrative examples, when supporting surface 214 is substantially planar, composite material 252 can be cured into a composite skin. In some illustrative examples, when supporting surface 214 has a trough or other geometric feature, composite material 252 can be cured to form a stiffener with internal cavity 206.

Composite material 254 can be cured to form either a composite skin or a composite stiffener, depending upon the design of cure tool 211. Reusable bladder 208 is configured to apply pressure to internal cavity 206 of composite part 204 during autoclave curing. The pressure applied by reusable bladder 208 is greater than a pressure under the reusable vacuum bag 248. The geometry of cure tool 211 and reusable bladder 208 can be modified to form composite part 204 having any desirable design with internal cavity 206.

Reusable composite curing system 202 and methods of use enable use of reusable vacuum bag 248 for composite curing. The illustrative examples enable high rate manufacturing. Using reusable vacuum bag 248 reduces time sealing the vacuum bag. Utilizing pressure passageway 236 to pressurize interior 224 of reusable bladder 208 enables use of reusable vacuum bag 248. The illustrative examples increase sustainability of composite curing. The illustrative examples provide pneumatic connector 228 in end fitting 210 and cure tool 211. When applying reusable bladder 208 to cure tool 211, pneumatic connector 228 indexes and quickly connects. Use of pneumatic connector 228 to provide pressurization to reusable bladder 208 can provide at least one of reduced preparation time for sealing reusable vacuum bag 248 to cure tool 211, reduced cost, or increased sustainability by using fewer disposable resources.

Pneumatic connector 228 provides connection between reusable bladder 208 and cure tool 211 quickly and without any additional tooling. Pneumatic connector 228 can also provide indexing of reusable bladder 208 relative to cure tool 211.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, multiple seals can be used to seal reusable vacuum bag 248 to cure tool 211 instead of a single seal, seal 250. In some illustrative examples, seal 250 is a first part of a interlocking seal and a second part (not depicted) of the interlocking seal is connected to the reusable vacuum bag 248.

Figure 3:
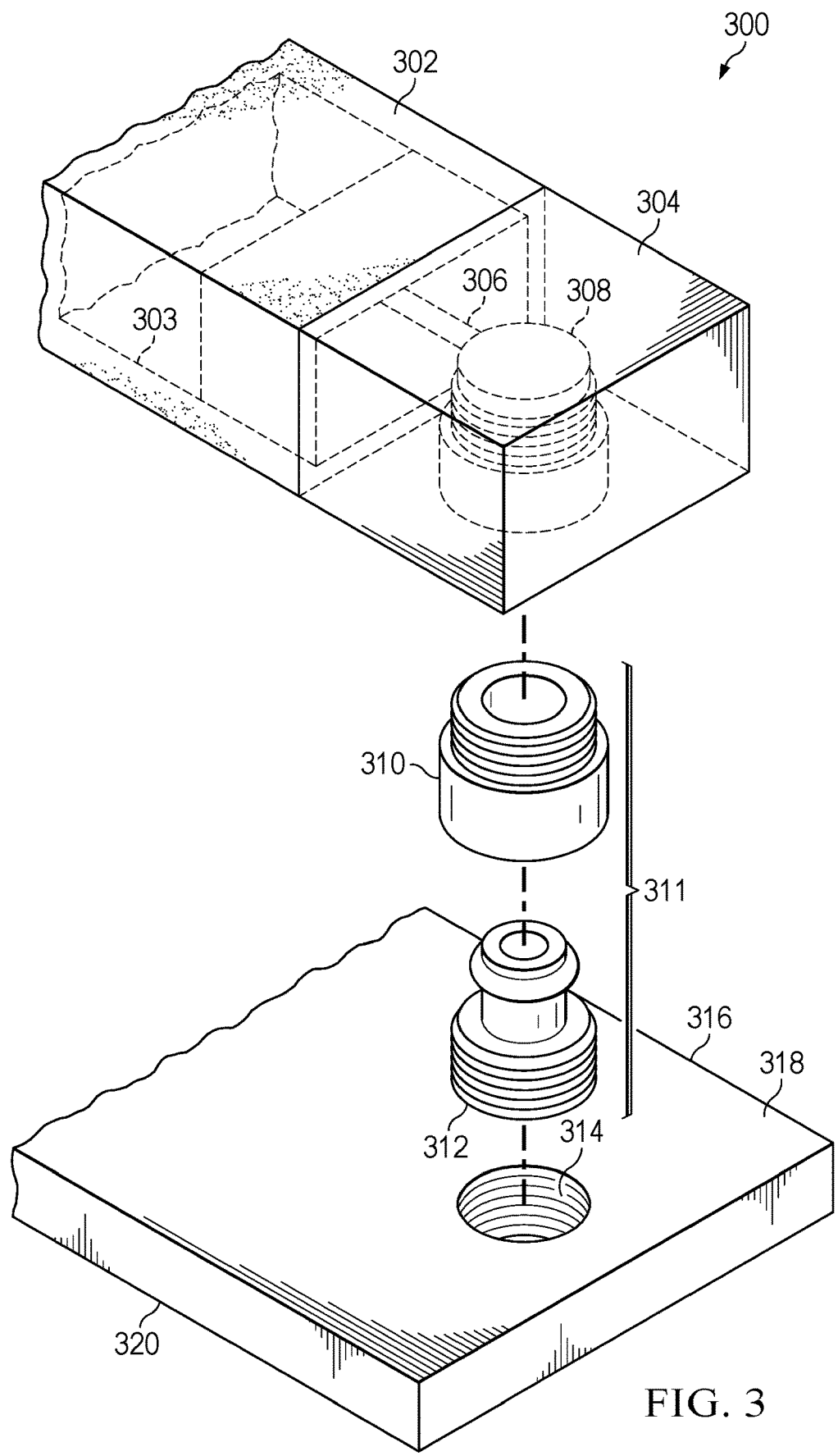
FIG. 3 is an isometric view of the reusable composite curing system with some portions in phantom in accordance with an illustrative embodiment.

Turning now to FIG. 3, an isometric view of the reusable composite curing system with some portions in phantom is depicted in accordance with an illustrative embodiment. Reusable composite curing system 300 is a physical implementation of reusable composite curing system 202 of FIG. 2.

Reusable composite curing system 300 comprises reusable bladder 302, end fitting 304 sealed to reusable bladder 302, and cure tool 316 having venting channel 314 extending from supporting surface 318 of cure tool 316 and exiting through underside 320 of cure tool 316. End fitting 304 comprises passage 306 in communication with interior 303 of reusable bladder 302. End fitting 304 further comprises first half 310 of pneumatic connector 311 secured within end fitting 304 and in communication with passage 306. In this illustrative example, first half 310 of pneumatic connector 311 is secured within threaded bore 308. Threaded bore 308 is in communication with passage 306.

Second half 312 of pneumatic connector 311 is secured within venting channel 314. First half 310 of pneumatic connector 311 is releasable from second half 312 of pneumatic connector 311 while maintaining second half 312 of pneumatic connector 311 in cure tool 316 and first half 310 of pneumatic connector 311 in end fitting 304.

In this illustrative example, first half 310 of pneumatic connector 311 is a female quick connector. First half 310 of pneumatic connector 311 can take any desirable form. In some other illustrative examples, first half 310 of pneumatic connector 311 is a male connector. In some other illustrative examples, first half 310 of pneumatic connector 311 can have a different female connector design than that depicted.

In this illustrative example, second half 312 of pneumatic connector 311 is a male quick connector. Second half 312 of pneumatic connector 311 can take any desirable form. In some other illustrative examples, second half 312 of pneumatic connector 311 is a female connector. In some other illustrative examples, second half 312 of pneumatic connector 311 can have a different male connector design than that depicted.

To apply external pressure to interior 303 of reusable bladder 302 during curing of a composite material, first half 310 of pneumatic connector 311 is connected to second half 312 of pneumatic connector 311. By connecting first half 310 to second half 312, a pressure passageway is formed. The pressure passageway is formed by passage 306, threaded bore 308, first half 310 of pneumatic connector 311, second half 312 of pneumatic connector 311, and venting channel 314.

The illustration of reusable composite curing system 300 in FIG. 3 is not meant to imply physical or architectural limitations to the manner in which an illustrative embodiment may be implemented. Although reusable bladder 302 and end fitting 304 have a trapezoidal cross-section, reusable bladder 302 and end fitting 304 can have any desirable geometry.

Additionally, although cure tool 316 is depicted as having a planar forming surface 318, in other illustrative examples, a trough can be present in cure tool 316. Although reusable bladder 302 is depicted as resting atop cure tool 316, in other illustrative examples, reusable bladder 302 can be placed over composite material within a trough of cure tool 316.

Figure 4:
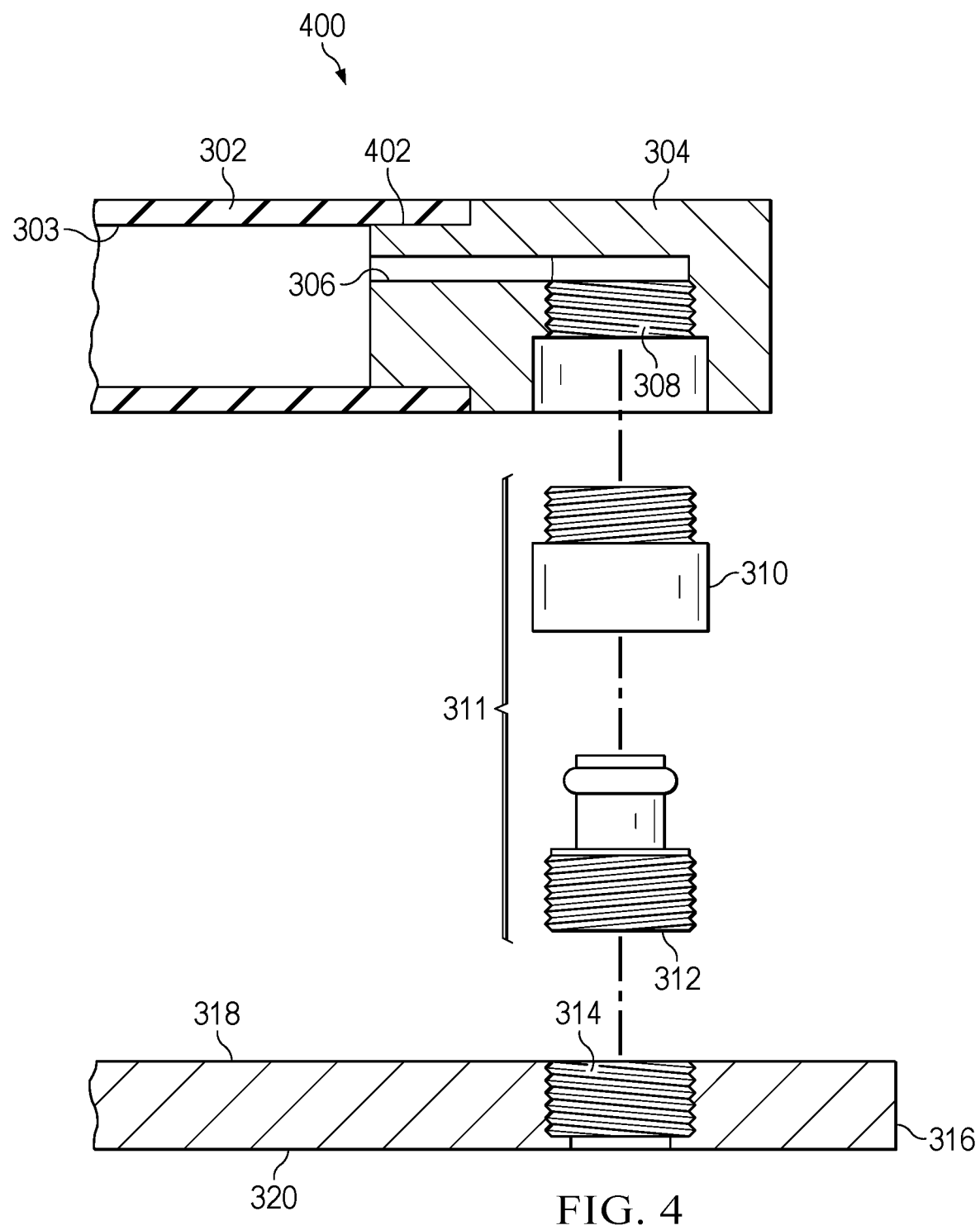
FIG. 4 is an exploded cross-sectional view of the reusable composite curing system with some portions in phantom in accordance with an illustrative embodiment.

Turning now to FIG. 4, an exploded cross-sectional view of the reusable composite curing system with some portions in phantom is depicted in accordance with an illustrative embodiment. View 400 is an exploded cross-sectional view of reusable composite curing system 300 of FIG. 3. In view 400, first half 310 of pneumatic connector 311 is exploded out of threaded bore 308 for a better view of threaded bore 308. During positioning and operation, first half 310 of pneumatic connector 311 remains secured within threaded bore 308.

In view 400, second half 312 of pneumatic connector 311 is exploded out of venting channel 314 for a better view of venting channel 314. During positioning and operation, second half 312 of pneumatic connector 311 remains secured within venting channel 314.

As depicted, reusable bladder 302 is sealed to exterior surface 402 of end fitting 304. As depicted, by reusable bladder 302 being sealed to exterior surface 402 of end fitting 304, a portion of end fitting 304 extends into interior 303 of reusable bladder 302.

Figure 5:
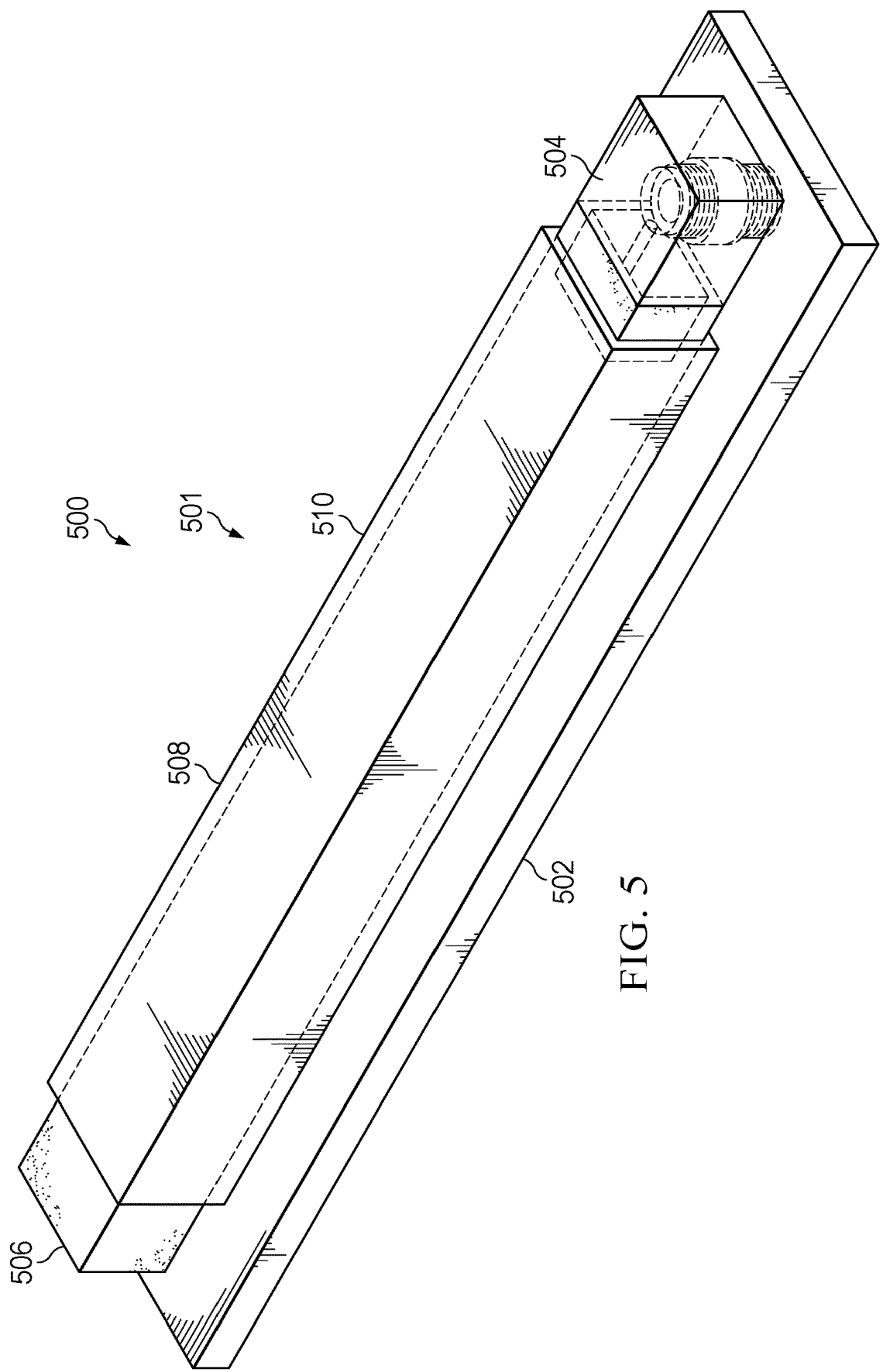
FIG. 5 is an isometric view of the reusable composite curing system supporting composite material for curing in accordance with an illustrative embodiment.

Turning now to FIG. 5, an isometric view of the reusable composite curing system supporting composite material for curing is depicted in accordance with an illustrative embodiment. View 500 is an isometric view of reusable composite curing system 501 supporting composite material for curing. Reusable composite curing system 501 comprises cure tool 502 and reusable bladder 506 connected to end fitting 504. In this illustrative example, composite material 508 is supported by cure tool 502. Composite material 508 takes the form of a composite skin. Composite material 510 is supported by reusable bladder 506. Composite material 510 forms a stiffener with an internal cavity.

Figure 6:
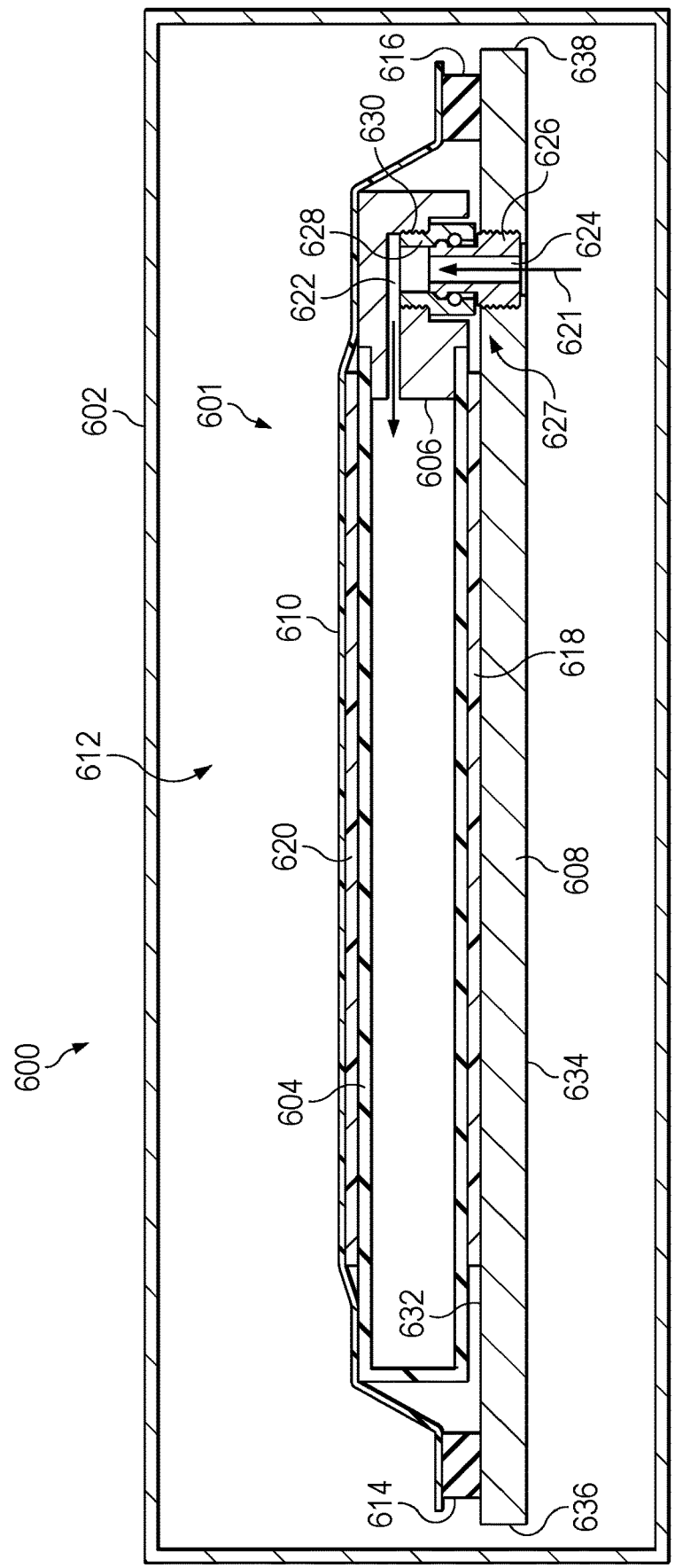
FIG. 6 is a cross-sectional view of the reusable composite curing system during curing of composite material in accordance with an illustrative embodiment.

Turning now to FIG. 6, a cross-sectional view of the reusable composite curing system during curing of composite material is depicted in accordance with an illustrative embodiment. View 600 is a cross-sectional view of reusable composite curing system 601 during curing of a composite material. In view 600, autoclave 602 is used to cure composite material 618 and composite material 620. Reusable composite curing system 601 comprises reusable bladder 604 sealed to end fitting 606 and cure tool 608. Reusable bladder 604 supports composite material 620. Cure tool 608 supports composite material 618.

End fitting 606 interfaces with cure tool 608 to allow pressurization of the interior of reusable bladder 604. Reusable vacuum bag 610 is sealed to cure tool 608 by seal 614 and seal 616. Reusable bladder 604 is pressurized by pressure 612 inside autoclave 602 without venting through reusable vacuum bag 610. Reusable bladder 604 is pressured by pressure 612 inside autoclave 602 through pressure passageway 621. Pressure passageway 621 allows the interior of reusable bladder 604 to be subjected to pressure 612.

Pressure passageway 621 is defined by passage 622, pneumatic connector 627, and venting channel 624. Venting channel 624 extends through cure tool 608. Second half 626 of pneumatic connector 627 is secured within venting channel 624. First half 628 of pneumatic connector 627 is secured within threaded bore 630. Passage 622 runs parallel to reusable bladder 604 into end fitting 606. Passage 622 connects to threaded bore 630 in end fitting 606. Passage 622 is perpendicular to first half 628 of pneumatic connector 627. As depicted, first half 628 of pneumatic connector 627 is a female connector while second half 626 of pneumatic connector 627 is a male connector.

Although venting channel 624 is depicted as extending through supporting surface 632 to underside 634, in other illustrative examples a venting channel can extend through side 636 or side 638 to allow pressure 612 to access the interior of reusable bladder 604. In some illustrative examples, pressure 612 is referred to as an external pressure as pressure 612 is outside a vacuum chamber formed between reusable vacuum bag 610 and cure tool 608.

Figure 7:
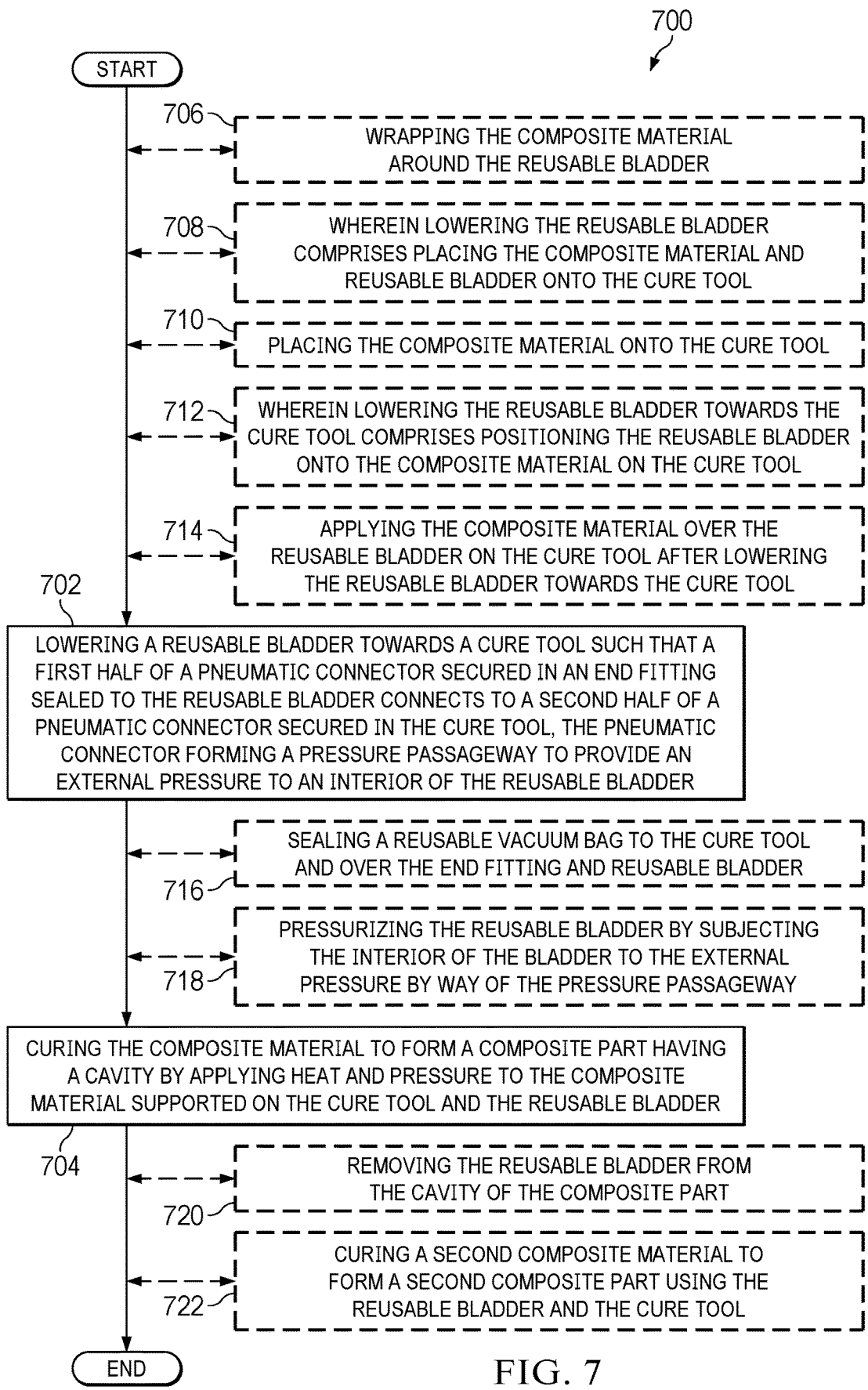
FIG. 7 is a flowchart of a method of curing a composite material in accordance with an illustrative embodiment.

Turning now to FIG. 7, a flowchart of a method of curing a composite material is depicted in accordance with an illustrative embodiment. Method 700 can be used to form components of aircraft 100 of FIG. 1. Method 700 can be performed using reusable composite curing system 202 of FIG. 2. Method 700 can be performed using reusable composite curing system 300 of FIGS. 3 and 4. Method 700 can be performed using reusable composite curing system 501 of FIG. 5. Method 700 can be performed using reusable composite curing system 601 of FIG. 6.

Method 700 lowers a reusable bladder towards a cure tool such that a first half of a pneumatic connector secured in an end fitting sealed to the reusable bladder connects to a second half of a pneumatic connector secured in the cure tool, the pneumatic connector forming a pressure passageway to provide an external pressure to an interior of the reusable bladder (operation 702). The first half of the pneumatic connector is secured within the end fitting prior to lowering the reusable bladder. In some illustrative examples, method 700 secures the first half of the pneumatic connector within the end fitting prior to lowering the reusable bladder. The end fitting is sealed to the reusable bladder prior to lowering the reusable bladder. In some illustrative examples, method 700 seals the end fitting to the reusable bladder. As a result, the reusable bladder with the end fitting and first half of pneumatic connector is lowered as a single component towards the cure tool. The second half of the pneumatic connector is secured to the cure tool prior to lowering the reusable bladder towards the cure tool. In some illustrative examples, method 700 secures the second half of the pneumatic connector to the cure tool prior to lowering the reusable bladder. By lowering the reusable bladder towards the cure tool, the first half of the second pneumatic connector connects to the second half of the pneumatic connector. In some illustrative examples, the pneumatic connector is a quick connector.

Method 700 cures the composite material to form a composite part having an internal cavity by applying heat and pressure to the composite material supported on the cure tool and the reusable bladder (operation 704).

In some illustrative examples, method 700 wraps the composite material around the reusable bladder (operation 706). In some illustrative examples, the reusable bladder forms an internal cavity for a resulting composite part. In some illustrative examples, lowering the reusable bladder comprises placing the composite material and reusable bladder onto the cure tool (operation 708).

In some illustrative examples, method 700 places the composite material onto the cure tool (operation 710). In some illustrative examples, the composite material placed onto the cure tool is a composite skin in a resulting composite part. In some illustrative examples, the composite material placed onto the cure tool is placed into a trough to form a stiffener in a resulting composite part. In some illustrative examples, lowering the reusable bladder towards the cure tool comprises positioning the reusable bladder onto the composite material on the cure tool (operation 712).

In some illustrative examples, method 700 applies the composite material over the reusable bladder on the cure tool after lowering the reusable bladder towards the cure tool (operation 714). In some illustrative examples, the composite material applied over the reusable bladder forms a composite skin in a resulting composite part.

In some illustrative examples, method 700 seals a reusable vacuum bag to the cure tool and over the end fitting and reusable bladder (operation 716). Vents are not placed into reusable vacuum bag for pressurizing the reusable bladder. Sealing the reusable vacuum bag forms a vacuum chamber between the reusable vacuum bag and the cure tool. The composite material to be cured is positioned within the vacuum chamber.

In some illustrative examples, method 700 pressurizes the reusable bladder by subjecting the interior of the bladder to the external pressure by way of the pressure passageway (operation 718). The external pressure is a pressure outside of the vacuum chamber. When the reusable composite curing system is present in an autoclave, the external pressure is the pressure inside the autoclave. In other illustrative examples, a pressure supply, such as a pump or other pressure source, is connected to the cure tool to apply pressure to the interior of the reusable bladder.

In some illustrative examples, method 700 removes the reusable bladder from the internal cavity of the composite part (operation 720). In some illustrative examples, method 700 cures a second composite material to form a second composite part using the reusable bladder and the cure tool (operation 722). In these illustrative examples, after removal from the internal cavity of the composite part, the reusable bladder and the cure tool are repeatedly used to cure composite parts.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 706 through operation 722 may be optional.

Figure 8:
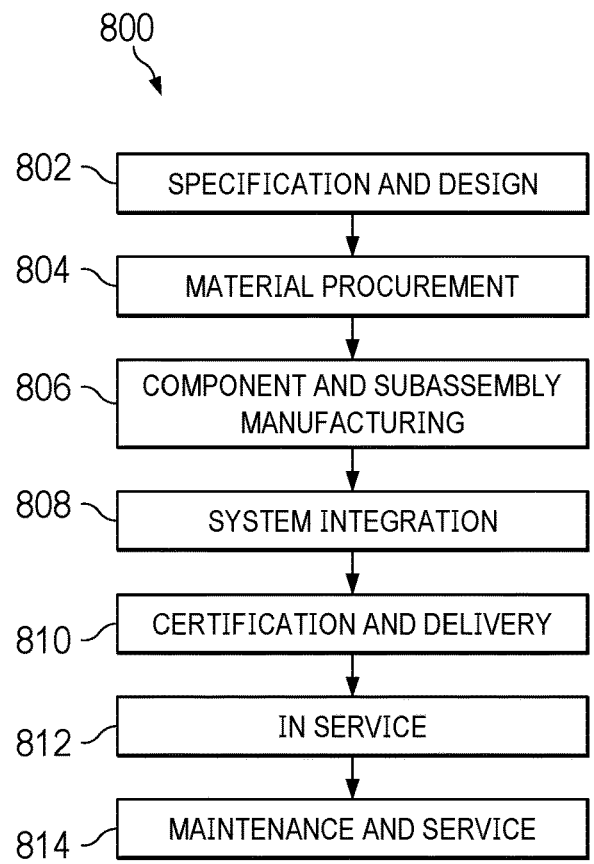
FIG. 8 is an illustration of an aircraft manufacturing and service method in a form of a block diagram in accordance with an illustrative embodiment.
Figure 9:
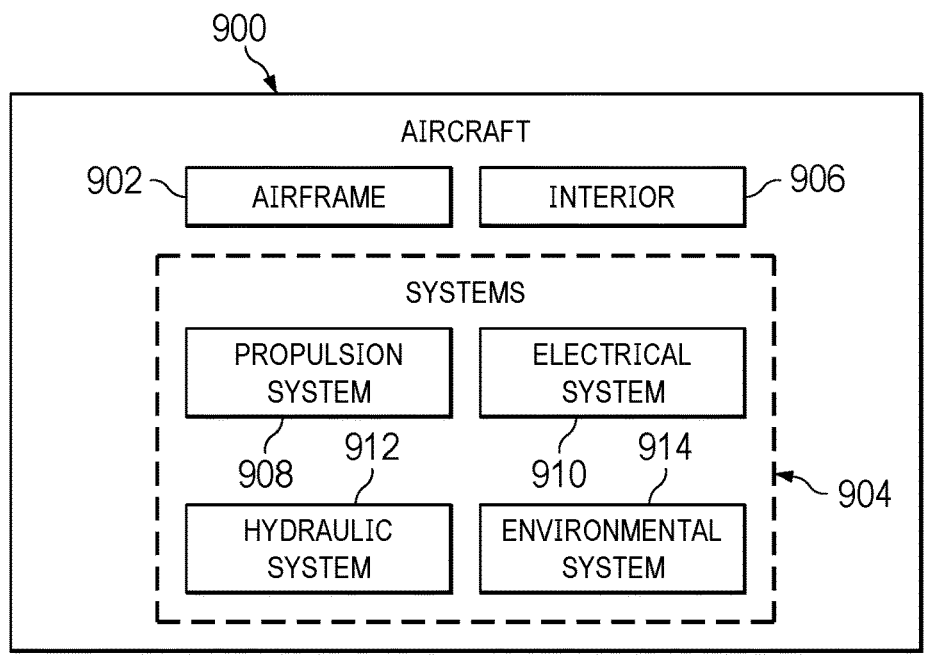
FIG. 9 is an illustration of an aircraft in a form of a block diagram in which an illustrative embodiment may be implemented.

Illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method in a form of a block diagram is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, or other maintenance and service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft in a form of a block diagram is depicted in which an illustrative embodiment may be implemented. In this example, aircraft 900 is produced by aircraft manufacturing and service method 800 of FIG. 8 and may include airframe 902 with plurality of systems 904 and interior 906. Examples of systems 904 include one or more of propulsion system 908, electrical system 910, hydraulic system 912, and environmental system 914. Any number of other systems may be included.

Apparatuses and methods embodied herein may be employed during at least one of the stages of aircraft manufacturing and service method 800. One or more illustrative embodiments may be manufactured or used during at least one of component and subassembly manufacturing 806, system integration 808, in service 812, or maintenance and service 814 of FIG. 8.

The illustrative examples provide a reusable composite curing system and methods that enable use of reusable vacuum bagging for composite curing. The illustrative examples enable high rate manufacturing of composite curing by reducing time sealing the vacuum bag. The illustrative examples increase sustainability of composite curing. The illustrative examples provide a pneumatic connector in a reusable bladder and a cure tool. When applying the reusable bladder to the cure tool, the pneumatic connector indexes and quickly connects.

The illustrative examples enable the use of reusable vacuum bagging that improves rate and sustainability, saves time, and adds to process robustness. The connection between the pneumatic connector is more robust than tacky tape. The illustrative examples utilize metallic end fittings on reusable bladders. In some illustrative examples, the cure tool comprises a through-hole venting channel. In some illustrative examples, the through-hole venting channel can be created through simple machining.

Quick disconnects are installed into the venting channel of the cure tool and the threaded bore of the end fitting. The threaded bore extends partially into the end fitting. The threaded bore pneumatically connects to a passage extending away from the threaded bore.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A reusable composite curing system that comprises:
   a reusable bladder;
   an end fitting sealed to the reusable bladder, wherein the end fitting comprises:
      a bore that is threaded, penetrates partially into the end fitting, and connects, at an interior most point of the bore, to a passage that exits the bore perpendicular to an axis of the bore and into communication with an interior of the reusable bladder; and
   a first half of a pneumatic connector threaded into the bore and in communication with the passage; and
   a cure tool that comprises a venting channel that extends from a supporting surface of the cure tool and exits through one of an underside or a side of the cure tool; and
   a second half of the pneumatic connector secured within and extending out from the venting channel, wherein the first half of the pneumatic connector is configured to release from the second half of the pneumatic connector while the second half of the pneumatic connector remains in the cure tool and while the first half of the pneumatic connector remains in the end fitting.

2. The reusable composite curing system of claim 1, wherein the end fitting is formed of a metallic material.

3. The reusable composite curing system of claim 1, wherein one of the first half and the second half of the pneumatic connector is a female quick connector, and wherein the other of the first half and the second half is a male quick connector.

4. The reusable composite curing system of claim 1, wherein the passage runs perpendicular to the first half of the pneumatic connector.

5. The reusable composite curing system of claim 1 further comprising:
   a reusable vacuum bag sealed to the cure tool, wherein the reusable vacuum bag completely covers the reusable bladder and the end fitting.

6. The reusable composite curing system of claim 1, wherein the passage, pneumatic connector, and venting channel define a pressure passageway that allows the interior of the reusable bladder to be subjected to an external pressure.

7. The reusable composite curing system of claim 1, wherein threads in the bore in the end fitting stop short of the passage.

8. A reusable composite curing system that comprises:
- a reusable bladder configured to apply pressure to an internal cavity of a composite part during autoclave curing;
- an end fitting sealed to the reusable bladder, wherein the end fitting comprises:
  - a bore that is threaded, penetrates partially into the end fitting, and connects, at an interior most point of the bore, to a passage that exits the bore perpendicular to an axis of the bore and into communication with an interior of the reusable bladder; and
  - a first half of a pneumatic connector threaded into the bore and in communication with the passage;
- a cure tool that comprises a venting channel that extends from a supporting surface of the cure tool and exits through one of an underside or a side of the cure tool;
- a second half of the pneumatic connector secured within and extending out from the venting channel, wherein the first half of the pneumatic connector is configured to release from the second half of the pneumatic connector while the second half of the pneumatic connector remains in the cure tool and while the first half of the pneumatic connector remains in the end fitting; and
- a reusable vacuum bag sealed over the reusable bladder and the end fitting, the pressure applied by the reusable bladder greater than a pressure under the reusable vacuum bag.

9. The reusable composite curing system of claim 8, wherein the pneumatic connector is a quick connector.

10. The reusable composite curing system of claim 8, wherein the end fitting is formed of a metallic material.

11. The reusable composite curing system of claim 8, wherein the passage runs perpendicular to the first half of the pneumatic connector.

12. A method of curing a composite material, the method comprising:
- using a reusable composite curing system for completing the following steps:
  - lowering a reusable bladder towards a cure tool such that a first half of a pneumatic connector secured in an end fitting sealed to the reusable bladder connects to a second half of the pneumatic connector secured in the cure tool, the pneumatic connector forming a pressure passageway to provide an external pressure to an interior of the reusable bladder; and
  - curing the composite material to form a composite part having an internal cavity by applying heat and pressure to the composite material supported on the cure tool and the reusable bladder, wherein the reusable composite curing system comprises:
- the reusable bladder;
- the end fitting sealed to the reusable bladder, wherein the end fitting comprises:
- a bore that is threaded, penetrates partially into the end fitting, and connects, at an interior most point of the bore, to a passage that exits the bore perpendicular to an axis of the bore and into communication with an interior of the reusable bladder; and
- the first half of the pneumatic connector threaded into the bore and in communication with the passage; and
- the cure tool that comprises a venting channel that extends from a supporting surface of the cure tool and exits through one of an underside or a side of the cure tool; and
- the second half of the pneumatic connector secured within and extending out from the venting channel, wherein the first half of the pneumatic connector is configured to release from the second half of the pneumatic connector while the second half of the pneumatic connector remains in the cure tool and while the first half of the pneumatic connector remains in the end fitting.

13. The method of claim 12 further comprising:
sealing a reusable vacuum bag to the cure tool and over the end fitting and the reusable bladder.

14. The method of claim 12 further comprising:
pressurizing the reusable bladder by subjecting the interior of the reusable bladder to the external pressure by way of the pressure passageway.

15. The method of claim 12 further comprising:
wrapping the composite material around the reusable bladder; and
wherein lowering the reusable bladder comprises placing the composite material and reusable bladder onto the cure tool.

16. The method of claim 12 further comprising:
placing the composite material onto the cure tool; and
wherein lowering the reusable bladder towards the cure tool comprises positioning the reusable bladder onto the composite material on the cure tool.

17. The method of claim 12 further comprising:
applying the composite material over the reusable bladder on the cure tool after lowering the reusable bladder towards the cure tool.

18. The method of claim 12 further comprising:
removing the reusable bladder from the internal cavity of the composite part; and
curing a second composite material to form a second composite part using the reusable bladder and the cure tool.

* * * * *